July 28, 1959  R. W. KETCHLEDGE  2,897,369
RADIATION SENSITIVE SCANNING SYSTEM
Filed Dec. 28, 1944  3 Sheets-Sheet 1

INVENTOR
R.W. KETCHLEDGE
BY
*Walter E. Kiesel*
ATTORNEY

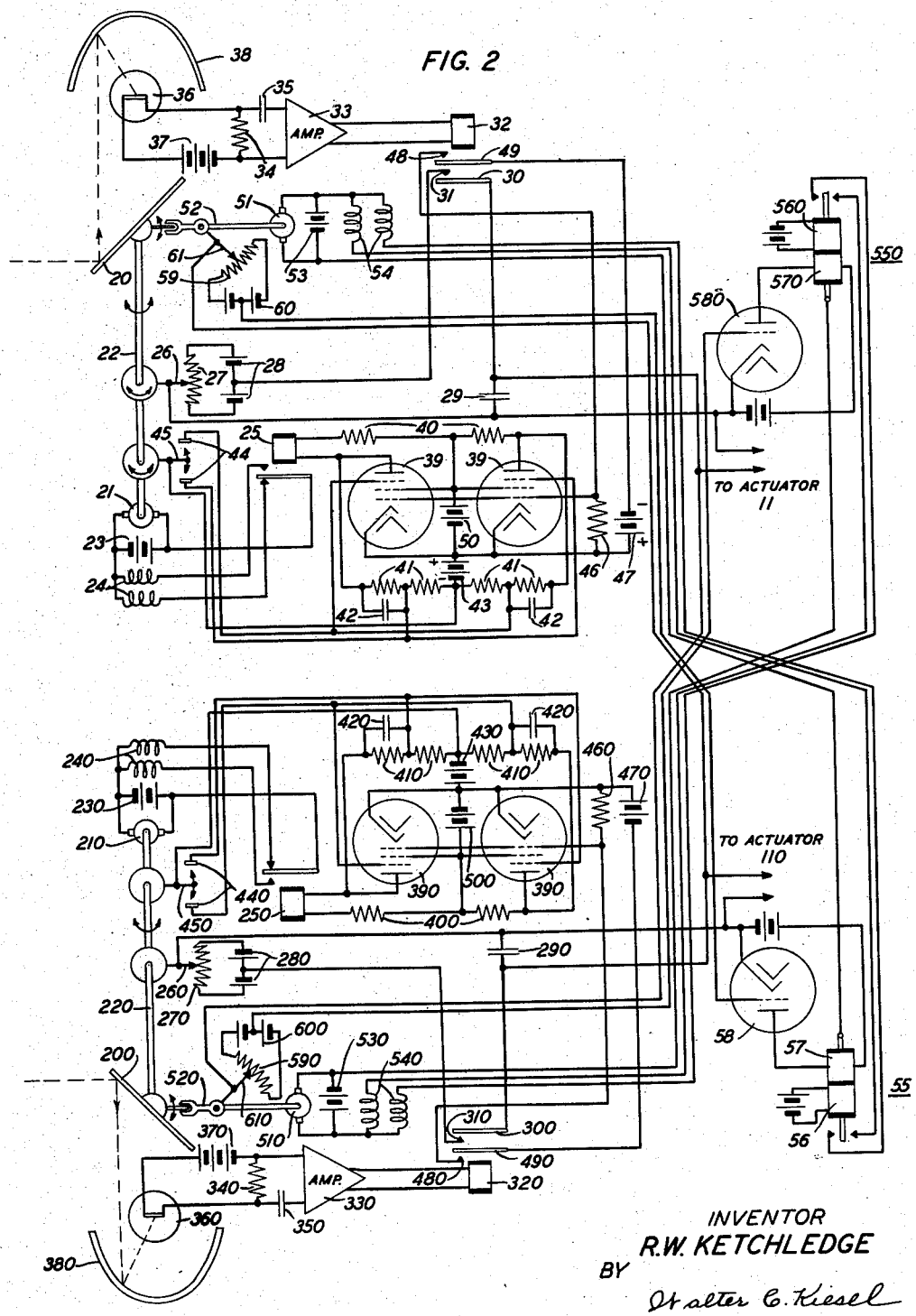

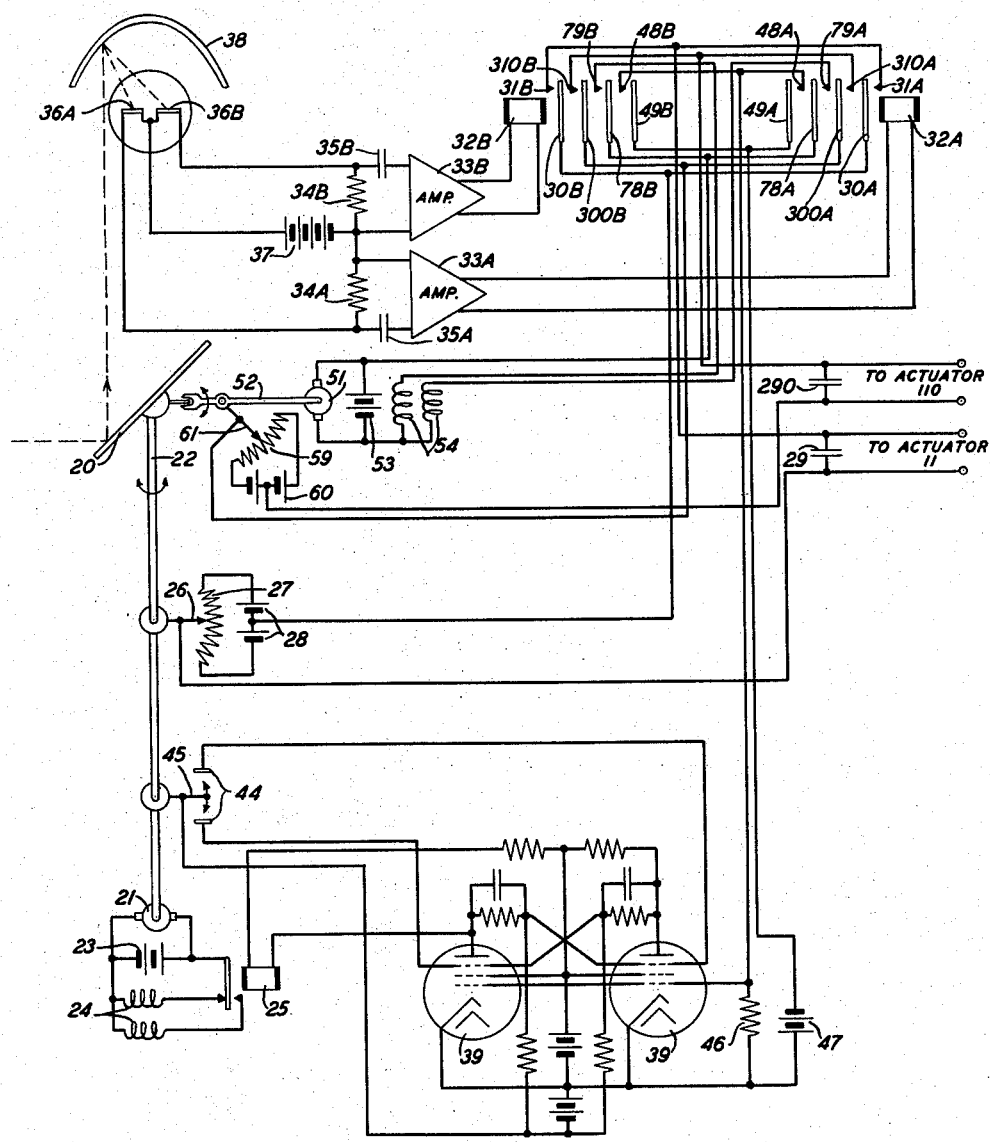

United States Patent Office 2,897,369
Patented July 28, 1959

2,897,369

RADIATION SENSITIVE SCANNING SYSTEM

Raymond W. Ketchledge, Jamaica, N.Y., assignor to Bell Telephone Laboratories, Incorporated, New York, N.Y., a corporation of New York Application December 28, 1944, Serial No. 570,181

13 Claims. (Cl. 250—83.3)

This invention relates to signal translating systems and, more particularly, to such systems responsive to wave energy emanating from a source and detected at a point, for producing signals indicative of the direction of the source with respect to the point.

In one specific aspect, this invetnion relates to steering systems responsive to wave energy, such as infra-red radiation, emanating from a target, for guiding a body, such as an aerial bomb, to the target.

Such steering systems, one type of which is described in Patent 2,826,380, issued March 11, 1958, of Raymond W. Ketchledge, comprise, in general, a wave energy responsive scanner which is actuated, e.g. rotated or oscillated, to scan a field of prescribed angular extent in one dimension at a preassigned frequency and a detector and associated apparatus, responsive to energy received by the scanner from a target within the field viewed, for producing a signal of polarity and amplitude determined by the position of the body within the field. The direction of scan may be such that the signal produced is indicative of the bearing of the target or such that it is indicative of the elevation of the target. Of course, two scans may be utilized to provide information as to both the bearing and elevation of the target, in accordance with which information the body is steered in two dimensions to guide it to the target.

To enable the initial location of a target, it is desirable that the amplitude of the scan, for example the angular motion of the scanner, be rather large. On the other hand, particularly in the case of a moving target, it is highly desirable that information as to the position of the target be obtained repeatedly at relatively high frequency.

It is eminently desirable also that once a target has been located it be held in the field of view of the scanner. Inherently, the magnitude of this field in the dimension normal to the scanning dimension is limited so that the possibility exists, particularly in the case of fairly high relative speeds between the target and the body being steered, that the target, even after being located initially, may move out of the field of view of the scanner.

One object of this invention is to increase the sensitivity of signal translating systems responsive to wave energy emanating from a source and adapted to produce a signal indicative of the direction of the source relative to a reference point.

More specifically one object of this invention is to enable the attainment, in such systems adapted to steer a body to a target, of information as to the position of the target relative to the body, repeatedly at relatively high frequency.

Another object of this invention is to realize substantially continuous automatic tracking of a target by a system responsive to wave energy emanating from the target, after an initial location of the target within the field of response of the system.

A further object of this invetnion is to automatically adjust a scanning element in a system of the general type above described so that when a target once appears in the field of view of the scanner it is held within this field.

In accordance with one feature of this invetnion, in a wave energy responsive system comprising a scanner which is oscillated initially in one dimension for the purpose of detecting an object within a large angular field, means are provided for automatically limiting the amplitude and increasing the frequency of the oscillatory motion whenever an object is detected in the field whereby only a segment of the field which embraces the object is scanned repeatedly and at relatively high frequency.

In accordance with another feature of this invention, in a system comprising a scanner actuated to oscillate in one dimension, means operable automatically when a target is detected are provided to tilt the scanner in the dimension normal to the scanning dimension to align the scanner with the target in the normal dimension. For example, in a system intended to produce a signal indicative of the bearing of the target, the means noted tilts the scanner to align it in elevation with the target. Similarly, in an elevation determining system, the scanner is tilted to align it in bearing with the target.

As will be pointed out in detail hereinafter, the invention may be embodied in two dimensional object locating or steering systems by utilizing either two mutually perpendicular scans or two parallel scans. In the former case, the tilt of each scanner is controlled by a signal derived from the other scanner; in the latter case, a single scanner may be employed and its motion in two perpendicular directions controlled by signals derived from the two scans in combination.

The invention and the above noted and other features thereof will be understood more clearly and fully from the following detailed description with reference to the accompanying drawing in which:

Fig. 2 is a circuit schematic of a system of the configuration shown in Fig. 1;

Fig. 4 is a circuit schematic of a system of the configuration shown in Fig. 3.

Figure 1:
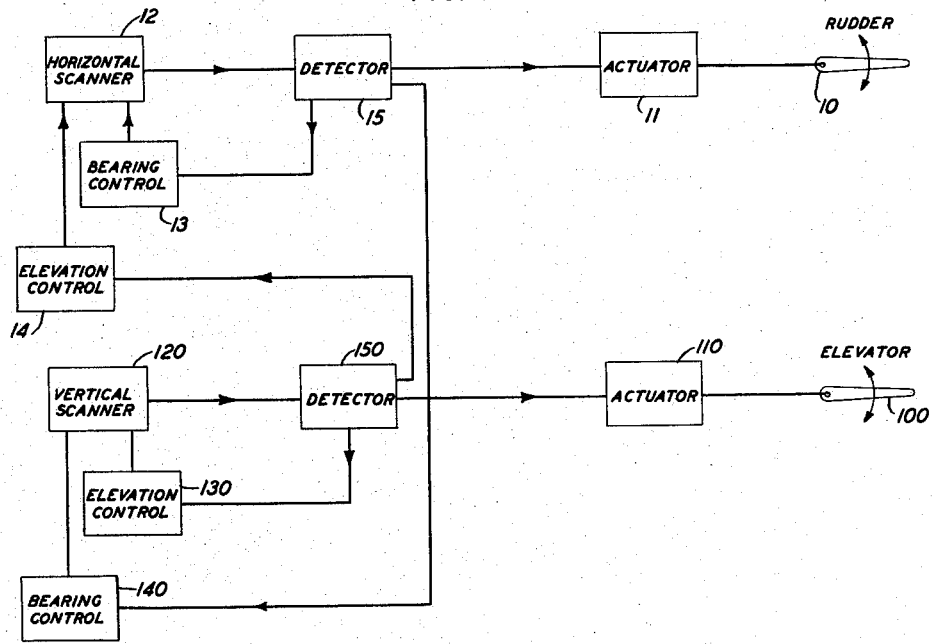
Fig. 1 is a diagram in functional block form of a steering system illustrative of one embodiment of this invention.

Referring now to the drawing, the system illustrated in Fig. 1 is adapted to effect steering of a body, such as an aerial bomb, in two mutually perpendicular dimensions. For convenience of discussion, these dimensions may be considered as horizontal and vertical although, as will be appreciated from the ensuing description, control in any two mutually perpendicular dimensions may be realized within the purview of this invention in its broader aspects.

The system illustrated in Fig. 1 comprises two similar portions, one for controlling a rudder 10 to steer the body horizontally and the other for controlling an elevator to steer the body vertically. In the drawing, each of the elements of the elevator controlling portions is designated by the same reference number increased by a factor of 10 as the corresponding element of the rudder control portion.

The latter comprises an actuator 11 for deflecting the rudder in one or the opposite direction in accordance with information as to the bearing of a source of radiant energy, e.g. a target, derived by way of a scanner 12 which is actuated by a bearing control 13 to scan a field of prescribed angular extent, repeatedly and in the horizontal direction. The scanner 12 is arranged to be tilted normal to the scanning direction by an elevation control 14. A detector 15 energized in accordance with radiant energy received by the scanner 12 produces signals for controlling the actuator 11 and bearing control 13.

In the elevator control portion of the steering system, the scanner 120 is actuated by the elevation control to scan substantially the same field as the scanner 12 but in the vertical direction and is arranged to be tilted normal to the direction of its scan by the bearing control 140.

The bearing control 140 is subject to control in accordance with signals derived from the detector 15. Similarly, the elevation control 14 is subject to control in accordance with signals derived from the detector 150. The elements of the system, it will be understood, are mounted on the body to be steered so that the scanners view the field ahead of the body. The body itself, for example an aerial bomb, may be of generally known construction and, therefore, detailed illustration of such construction is deemed unnecessary.

Briefly, the general operation of the system and the functions of the elements thereof are as follows: The scanners 12 and 120 scan a field of relatively large extent and are associated with the respective detector in such manner that when the energy received by the scanners is uniform throughout the scanning cycle no signals are produced by the detector. When, however, an energy discontinuity, due to, for example, the presence of a target in the field viewed, is encountered by the scanners, the detector 15 produces a signal of polarity and amplitude determined by the bearing of the target relative to the body and the detector 150 produces a signal of polarity and amplitude determined by the elevation of the target. Each signal is applied to the respective actuator to cause deflection of the rudder or elevator accordingly.

The signal produced by the detector 15, or one proportional thereto, is applied to the bearing control 13 in such manner that the field covered by the scanner 12 is restricted to one of small angular extent to either side in the horizontal dimension of the line from the target to the body. Similarly, the signal produced by the detector 150, or one proportional thereto, is applied to the elevation control 130 in such manner that the field covered by the scanner 120 is restricted to one of small angular extent to either side, in the vertical dimension, of the line noted.

Also, the signal produced at each detector, or one proportional thereto, is applied to the tilt control for the other scanner in such manner that the horizontal scanner 12 is aligned vertically with the target by operation of the elevation control 14 and the vertical scanner is aligned horizontally with the target by operation of the bearing control 140. Thus, when a target appears in the field, the scanners are actuated to such positions that the target is centered in the field viewed by the scanners and the scan in both horizontal and vertical dimensions is restricted whereby accurate information at relatively high frequency as to the bearing and elevation of the target is obtained.

Details of a steering system of the configuration shown in Fig. 1 and including scanners and detectors of the type disclosed in the application hereinabove identified are illustrated in Fig. 2. As illustrated in this figure, the horizontal scanner comprises a plane mirror 20 which is oscillated to scan a field horizontally as by a reversible motor 21 coupled to the mirror by a shaft 22, the motor being energized from a source, such as a battery 23, and having a pair of field windings 24. The direction of rotation of the motor is determined by which of the windings 24 is energized and this, in turn, is determined by the condition of a relay 25 which is controlled by a bearing control including an electronic reversing circuit which will be described in detail hereinafter.

Coupled to the shaft 22 is the contact arm 26 of a potentiometer resistor 27 bridged across a source, such as a battery 28. As is apparent, the potential of the contact arm 26 relative to the mid-point of the battery 28 is dependent in polarity and amplitude upon the position of the mirror 20. The contact arm 26 is connected to one terminal of a condenser 29, the other terminal of the condenser being arranged for connection to the mid-point of the source 28 over the armature 30 and contact 31 of a relay 32. The relay is included in the output circuit of an amplifier 33, the input circuit for the amplifier including a suitable resistor 34 and condenser 35 and a highly sensitive bolometer 36 in series with a source such as a battery 37. The bolometer 36 is mounted at the focus of a parabolic reflector 38 which in turn is mounted opposite the mirror 20 to receive radiant energy reflected therefrom. The amplifier 33 is so biased that normally the relay 32 is released.

As noted heretofore, the mirror 20 is oscillated to scan a field repeatedly and in the horizontal direction. If the field scanned is of substantially uniform temperature throughout, the resistance of the bolometer 36 remains constant so that the amplifier 33 remains in its initial condition and the relay 32 remains released. If, however, there exists in this field a substantial temperature discontinuity, due to, for example, an object or target, such as a ship, having a temperature higher than that of the surrounding area, at some point in each scan the bolometer 36 will receive an increment in infra-red radiation via the mirror 20 and reflector 38 and its resistance will change accordingly. Hence, signal pulses are applied to the input circuit for the amplifier 33 and the relay 32 operates to close a charging circuit for the condenser 29 over the armature 30 and contact 31. Inasmuch as, as noted hereinabove, the potentiometer voltage at any time is determined by the position of the mirror 20 and as the time in each scan at which the relay 32 is operated is determined by the time at which the mirror receives infra-red radiation from the object or target, it will be seen that the condenser 29 will be charged to a voltage related in polarity and proportional in amplitude to the bearing of the object or target relative to the body to be steered. This voltage is utilized to effect actuation of the rudder 10, for example in the manner described in the application hereinabove identified, to steer the body in the horizontal dimension toward the object or target.

The electronic reversing circuit includes a pair of similar electron discharge devices 39, for example of the pentode type as shown, the anodes of which are connected to the relay 25 through suitable resistors 40, so that, as is apparent, the direction of the current supplied to the relay 25 is determined by the relative outputs of the two devices 39. Connected between each anode and the respective cathode are a pair of resistors 41, one of which is in shunt with a condenser 42, and a biasing source 43. The suppressor grid of each device, that is the grid nearest the anode, is connected directly to the common terminal of the resistors 41 associated with the other device. Each of these grids is connected also to the respective contact 44 of a limit switch, the armature 45 of which is coupled to the shaft 22 and is connected electrically to the source 43 as shown. The control grids of the two devices, that is the grids nearest the cathodes, are connected in common to a resistor 46 which is connected also to the cathodes of the two devices as shown. The resistor 46 is arranged to be connected in series with a source 47 over the contact 48 and armature 49 of the relay 32. The screen grids of the two devices are connected to the anode voltage source 50 as shown.

The devices 39 and associated elements, it will be apparent, constitute a pulsing circuit wherein the triggering is effected by either engagement of the armature 45 of the limit switch with either of the contacts 44 or the application of a signal pulse to the control grids by way of the resistor 46. Specifically, when either device is conducting and the armature 45 is free from both contacts 44 and the circuit including the resistor 46 is open, the potential of the suppressor grid of the other device, by virtue of its coupling to the anode of the first device, is driven to such value that the other device is held nonconducting. Hence, the current supplied to the relay 25 is of such polarity that the relay armature engages one contact and the motor 21 is energized to rotate the shaft 22 in one direction. Rotation of the shaft through a preassigned angle results in engagement of the armature 45 with one of the contacts 44 whereby a bias is applied to the suppressor grid of the conducting device from the source 43 sufficient to render this device nonconducting whereupon the potential of the suppressor grid of the other device decreases and the other device becomes conductive. Consequently, the polarity of the current supplied to the relay 25 is reversed, the relay armature is transferred to the other contact and the direction of rotation of the motor 21 is reversed. The motor then revolves the shaft in this direction until the armature 45 engages the other contact 44 whereupon the sequence of operations is repeated and the direction of rotation of the motor is again reversed. Thus, the mirror 20 is oscillated in the horizontal direction at a frequency determined by the constants of the reversing circuit to scan a field of angular extent horizontally determined by the limit switch. The frequency may be, for example, of the order of 1 cycle per second. Advantageously, the angle of field scanned is large, for example of the order of 60 degrees.

When the bolometer 36 is energized to cause operation of the relay 32 as described heretofore, a negative pulse is applied to the control grids of both devices 39 inasmuch as the circuit including the resistor 46 and source 47 is closed at the contact 48 and armature 49. For the duration of the pulse, both devices 39 are rendered non-conducting. However, because of the condensers 42, each of which is charged when the device 39 with which it is associated is conducting, the potential of the suppressor grid of the device which was conducting at the time of the application of the pulse to the control grids, is more negative than that of the device which was not conducting so that at the cessation of the pulse, the latter device prevails over the former and, thus, controls the relay 25. That is to say, the application of a pulse to the control grids by virtue of operation of the relay 32 results in a reversal of the direction of current supplied to the relay 25 and consequent reversal of direction of rotation of the motor 21.

The frequency of reversal of motor direction due to application of pulses to the control grids of the devices 39 will be dependent, of course, upon the relay times of the bolometer 36, amplifier 33, relay 32, motor 21 and electronic reversing circuit. These delay times are made small so that when a target appears in the field scanned by mirror 20, the motor 21 is controlled to oscillate the mirror through a small angle to either side of the line of alignment, in the horizontal dimension, of the mirror and target. For example, the amplitude of mirror oscillation may be made of the order of 6 degrees and the frequency of oscillation may be of the order of 10 cycles. Hence, information as to the bearing of the target, as represented by the voltage appearing across the condenser 29, is obtained repeatedly at relatively high frequency.

The elements of the elevator control portion of the system are designated in Fig. 2, as in Fig. 1, by the same reference numeral increased by a factor of 10 as the corresponding element of the rudder control portion. As is apparent from the drawing, the elevator portion is substantially the same as the rudder portion as thus far described, except, of course, that the motor 210 is controlled to oscillate the mirror 200 at right angles to the direction of oscillation of the mirror 20, whereby the mirror 200 scans a field vertically, and the motion of the mirror 200 is restricted in the vertical dimension when a target appears in the field.

Thus, in the steering system as thus far described, the two mirrors scan a large solid angle field until a target is detected in this field whereupon the amplitude of scan in both directions is limited and information as to the target bearing and elevation, as represented by the potentials appearing across the condensers 29 and 290 respectively, is obtained at relatively high frequency.

Each mirror is mounted for tilting in the dimension normal to the dimension of its scan, in accordance with control signals obtained from the circuit associated with the other mirror so that the mirror 20 is aligned with the target in elevation and the mirror 200 is aligned with the target in bearing. Specifically, as shown in Fig. 2, the mirror is tiltable by a reversible motor 51 coupled to the mirror 20 by a shaft 52. The motor is energized from a suitable source, such as a battery 53, and is provided with a pair of field windings 54. The direction of rotation of the motor 51 is determined by which of the windings is energized and this is determined in turn by the condition of a relay 55 having a polarizing winding 56 and a second winding 57 included in the output circuit of an electron discharge device 58. The input circuit for the device 58 includes the condenser 290 and a potentiometer 59, 60 the contact arm 61 of which is coupled to the shaft 52. As is apparent, the signal applied to the control grid of the device 58 is the resultant of the potential obtained from the potentiometer 59, 60 and that across the condenser 290. These potentials are so related and the relay 55 is so biased that when the two potentials are equal the armature of the relay 55 is out of engagement with both contacts of this relay, whereby the motor 51 remains stationary.

As has been pointed out heretofore, the potential appearing across the condenser 290 is related in polarity and proportional in amplitude to the elevation of the target relative to the body being steered. The potential obtained from the potentiometer 59, 60 is related in polarity and proportional in amplitude to the direction and angle respectively of the tilt of the mirror 20. Thus, equality between the two potentials exists when the mirror 20 is so tilted that it is aligned in the vertical direction with the target.

Similarly, the mirror 200 is tilted to align it horizontally with the target, by operation of the relay 550 associated with the device 580, the device 580 being controlled in accordance with the algebraic sum of the potential appearing across the condenser 29 and that obtained from the potentiometer 590, 600.

Thus, when a target appears in the field viewed by the two mirrors, not only is the amplitude of oscillation of each mirror in its scanning dimension limited as described heretofore, but also each mirror is aligned with the target in the direction normal to the scanning dimension. Stated in another way, the steering system is adjusted automatically to center the target in a restricted scanning field for the two mirrors. Consequently, the possibilities of a target, once located, passing out of the scanning field are minimized.

Also, because of the centering of the target and limitation of the scanning field, the possibility of false operation of the system in the event two or more targets exist in the large field capable of being scanned initially, is reduced, for once a target is detected the system is adjusted automatically to track that target.

Figure 3:
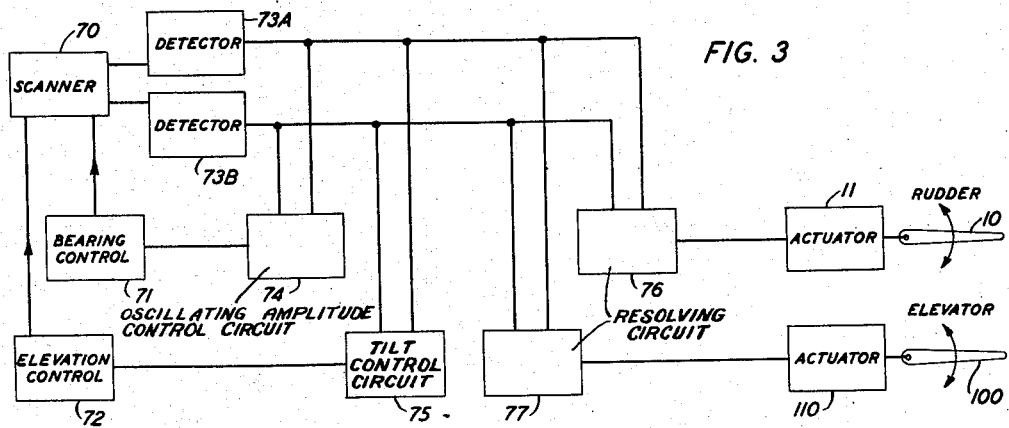
Fig. 3 is a functional block diagram of a steering system illustrative of another embodiment of this invention.

A steering system, for example, for an aerial bomb, illustrative of another embodiment of this invention, is illustrated in block form in Fig. 3 and comprises a scanner 70 which is oscillatable in one dimension, for example in the horizontal dimension by a bearing control 71, and is tiltable in the dimension normal to the first, for example vertically, by an elevation control 72. A pair of detectors 73A and 73B are energized in accordance with radiant energy received by the scanner and are so associated with the scanner that the fields of view corresponding to the two detectors are parallel and overlap to a preassigned extent. Thus, in effect, two parallel line scans of the field are obtained.

The two detectors 73 are associated with the bearing control 71 over a circuit 74 in such manner that when either detector receives energy via the scanner from a target within the field scanned, the amplitude of oscillation of the scanner is limited to a small angle about the line from the target to the body.

The two detectors 73 are associated also with the elevation control 72 over a circuit 75 in such manner that the scanner is tilted to align it in elevation with the target. Further, the two detectors are associated with the actuators 11 and 110 over circuits 76 and 77 respectively in such manner that the rudder is controlled in accordance with the bearing of the target and the elevator is controlled in accordance with the elevation of the target, whereby the body is steered to the target.

Functionally, the system illustrated in Fig. 3 is similar to that illustrated in Fig. 1 in that it enables initial scanning of a large angular field for the purpose of locating a target and, when a target is located, the system operates to limit the field scanned and to adjust the scanner so that the target is centered in this field. Generally speaking, the system illustrated in Fig. 3 differs from that shown in Fig. 1 in that two scans in parallel relation instead of mutually perpendicular scans are employed.

In a specific system, illustrated in Fig. 4, of the configuration shown in Fig. 3, the scanner and associated controls may comprise elements substantially the same as those in the rudder control portion of the system shown in Fig. 2 and described heretofore. These elements are identified by the same reference numerals in the two figures.

Thus, in the system illustrated in Fig. 4, the plane mirror 20 is arranged to be oscillated in one dimension, e.g. horizontally, by the motor 21 and to be tilted in the dimension normal to the first, e.g. vertically, by the motor 51. Potentiometers 27, 28 and 59, 60 are coupled to the shafts 22 and 52 respectively to produce potentiometer signals of polarity and amplitude at any time determined by the position of the mirror at that time. Infra-red radiation received by the mirror 20 is reflected to the parabolic reflector 38.

Associated with the reflector 38 to be energized by energy reflected therefrom, are a pair of highly sensitive bolometers 36A and 36B which are so mounted that the fields of view corresponding thereto overlap slightly. Thus, two slightly overlapping parallel line scans of the field covered by the mirror 20 are obtained. Each bolometer is included in the input circuit of a respective amplifier 33 and each amplifier controls a corresponding relay 32. The amplifiers are so constructed that normally both relays are released. When the field scanned by the mirror is of substantially uniform temperature throughout, the resistance of both bolometers remains constant; when, however, a temperature discontinuity, due to a target, exists in this field, either or both of the bolometers, depending upon the position of the target relative to the parallel line scans, receives radiant energy via the mirror 20 and reflector 38, whereby the bolometer resistance changes accordingly and signals are applied to the input circuit of one or both of the amplifiers 33 to cause operation of one or both of the relays 32.

Each of the relays 32 is provided with four armatures and associated contacts, the corresponding armatures and contacts being designated by the same reference numeral plus the letter, A or B, of the associated bolometer. The corresponding armatures of the two relays are connected directly together as shown. The two contacts 48 also are connected directly together and with the armatures 49 serve to control the circuit through the resistor 46 and source 47 for the electronic reversing circuit.

The two contacts 31 also are connected together directly and with the associated armatures 30 are included in an obvious circuit including the potentiometer 27, 28 and the condenser 29.

The armatures 78 are connected in common to one terminal of the source 53 and each of the associated contacts 79 is connected to a corresponding one of the windings 54 whereby, as will be apparent, when one relay 32 is operated the motor 51 will tilt the mirror in one direction, when the other relay 32 is operated the mirror is tilted in the opposite direction and when both relays 32 are operated the motor does not rotate and no tilting of the mirror occurs.

The two contacts 310 are connected directly together and to one terminal of the condenser 290, the other terminal of this condenser being connected to the midpoint of the battery 60. The associated armatures 300 are connected to the contact arm 61 whereby, when either relay 32 operates, the condenser is connected to the potentiometer 59, 60.

The operation of the system is as follows: Initially the mirror 20 is oscillated, say in the horizontal dimension, by the motor 21 under control of the electronic reversing circuit, to scan a field of large angle. It continues to so oscillate until a target appears in this field whereupon, one or both of the relays 32 operates. Operation of either relay 32 closes the circuit including the resistor 46 and source 47, whereby, as described heretofore in connection with Fig. 2, the amplitude of oscillation of the mirror is limited to a small angle to either side, in the horizontal dimension, of the line from the target to the body being steered. Operation of either relay 32 results also in closing of the charging circuit for the condenser 29, whereby the potential appearing across this condenser is related in polarity and proportional in amplitude to the bearing of the target.

Unless the target is substantially midway between the parallel scans, that is at such position that it falls within the overlap portion of the fields of view of the two bolometers 36, only one of the relays 32 will operate. This relay closes the energizing circuit for the respective winding 54 so that the motor tilts the mirror 20 until the target is within the overlap portion noted. For this condition, both relays 32 operate so that, as noted heretofore, rotation of the motor ceases. Tilting of the mirror 20 results in charging of the condenser 290 to a potential which is related in polarity and proportional in amplitude to the elevation of the target.

Thus, the system functions to adjust automatically the position and amplitude of oscillation of the mirror whereby the target is substantially centered in a restricted field of scan and accurate information at relatively high frequency as to bearing and elevation of the target is obtained in the form of potentials across the condensers 29 and 290. The rudder and elevator are controlled in accordance with these potentials to steer the body to the target.

Although in the specific system illustrated in Fig. 4 a single mirror 20 and reflector 38 are employed for affecting energization of the two bolometers 36, separate mirrors and reflectors may be utilized for the two bolometers if a greater overlap of the two fields of view is desired. The two mirrors, of course, in such case would be controlled in common to have the same direction and amplitude of oscillation and same direction and amplitude of tilt.

In both embodiments of the invention disclosed, it may be desirable in some cases to increase the dimension of the field scanned by each mirror, normal to the direction of oscillation of the mirror. In such cases, means may be provided for tilting the mirror at a slow rate so that it scans in two mutually perpendicular dimensions, and other means provided for disabling the auxiliary tilting means when a target appears in the field scanned. For example, the mirrors may be tilted by reversing motors which are disabled, as by operation of the respective amplifier or relay 32, when a target is detected.

Although specific embodiments of the invention have been shown and described, it will be understood that they are but illustrative and that various modifications may be made therein without departing from the scope and spirit of this invention as defined in the appended claims.

What is claimed is:

1. A signal translating system comprising wave energy responsive means, means for actuating said first means to scan a field in one dimension, operating means actuated in accordance with energy received by said first means, and means controlled in accordance with energy emanating from an object in said field for actuating said first means to align it with said object in a second dimension.

2. A signal translating system comprising wave energy responsive means, means for oscillating said first means to scan a field repeatedly in one dimension, operating means controlled in accordance with energy received by said first means, and means responsive to energy emanating from an energy discontinuity in said field for tilting said first means to align it with said discontinuity in the dimension normal to said first dimension.

3. A signal translating system comprising a mirror, means for oscillating said mirror to scan a field in one dimension, operating means responsive to infrared radiation received at said mirror from an object in said field, and means actuated in accordance with energy emanating from said object for tilting said mirror in the dimension normal to said one dimension to align it with said object in said normal dimension.

4. A signal translating system comprising a first wave energy responsive means, means for actuating said first means to scan a field in one dimension, a second wave energy responsive means, means for actuating said second means to scan said field in a second dimension, operating means associated with said first and second means, means energized in accordance with energy received by said first means from an object in said field for actuating said second means to align it with said object in said one direction, and means energized in accordance with energy received by said second means from said object for actuating said first means to align it with said object in said second dimension.

5. A signal translating system comprising a first mirror, means for oscillating said mirror to scan a field in one dimension, a second mirror, means for oscillating said second mirror to scan said field in a second dimension normal to said first dimension, a pair of operating elements each energized in accordance with infra-red radiation received by a respective mirror and responsive only when a temperature discontinuity in said field is received by the respective mirror, and means controlled by each of said operating elements for tilting the other mirror to align it with said discontinuity in the dimension normal to its respective dimension of scan.

6. A signal translating system comprising mirror means, means for actuating said mirror means to scan a field in one dimension, a pair of bolometers associated with said mirror means to receive infra-red radiation reflected therefrom and relatively positioned so that the scans corresponding to said bolometers are parallel and partially overlapping, operating means controlled by said elements, and means for actuating said mirror means upon a receipt thereby of infra-red radiation from an object in said field to align said mirror means with said object in the dimension normal to said one dimension.

7. A signal translating system comprising a mirror, means for actuating said mirror to scan a field in one dimension, a pair of translating elements responsive to radiant energy reflected from said mirror and associated therewith so that the fields of view for said elements overlap in part, operating means controlled by said elements, and means controlled by both said elements for tilting said mirror normal to said one dimension to such position that energy received by said mirror from an object in said field is reflected upon both said elements.

8. A signal translating system comprising wave energy responsive means, means for actuating said first means to scan a field in one dimension, operating means controlled in accordance with wave energy received by said first means, means responsive only when an energy discontinuity exists in said field for limiting the scan in said one dimension to a restricted portion of said field including said discontinuity, and means controlled in accordance with wave energy emanating from said discontinuity for actuating said first means to align it with said discontinuity in a dimension at an angle to said one dimension.

9. A signal translating system comprising wave energy responsive means, means for oscillating said first means to scan a field in one dimension, operating means controlled in accordance with energy received by said first means from said field to operate only when an energy discontinuity in said field is viewed by said first means, means responsive to operation of said operating means for limiting the scan in said dimension to a restricted portion of said field including said discontinuity, and means responsive to energy emanating from said discontinuity for actuating said first means to align it with said discontinuity in the dimension normal to said first dimension.

10. A signal translating system comprising a mirror, means for oscillating said mirror to scan a field in one dimension, operating means controlled in accordance with infra-red radiation reflected from said mirror to operate only when a temperature discontinuity is received by said mirror, means responsive to operation of said operating means for controlling said oscillating means to limit the scan of said first means in said one dimension to a restricted portion of said field including said discontinuity, and means responsive to energy emanating from said discontinuity for tilting said mirror to align it with said discontinuity in the dimension normal to said one dimension.

11. A signal translating system comprising a mirror, radiant heat responsive means cooperatively associated with said mirror to be energized in accordance with radiant heat reflected therefrom, means for oscillating said mirror, means for tilting said mirror normal to the direction of oscillation of said mirror, operating means controlled by said heat responsive means to operate only when an object of substantially different temperature than the surrounding area appears in the field of view of said mirror, means responsive to operation of said operating means for actuating said oscillating means to limit oscillation of said mirror to a restricted angle to either side of the line from said mirror to the object, means controlled in accordance with energy emanating from said object for actuating said tilting means to align said mirror with said object, and means for producing a signal related in amplitude and polarity to the position of said object, in the direction of oscillation of said mirror, with respect to said mirror.

12. A signal translating system in accordance with claim 11 comprising means for producing a second signal related in amplitude and polarity to the tilt of said mirror.

13. A signal translating system comprising wave energy responsive means, operating means actuated in accordance with energy received by said first means, reversible actuating means for oscillating said first means to scan a field, means comprising a pair of electron discharge devices coupled to constitute a trigger type pulsing circuit, for controlling said actuating means to effect a reversal thereof whenever a triggering pulse is applied to said circuit, means responsive to movement of said first means to either one of two preassigned extreme positions for applying a triggering pulse to said circuit, and means energized in accordance with the output of said first means for applying a triggering pulse to said circuit whenever an energy discontinuity is detected by said first means in the field scanned thereby.

References Cited in the file of this patent

UNITED STATES PATENTS

| | | |
|---|---|---|
| 1,343,393 | Hoffman | June 15, 1920 |
| 1,915,328 | Mirick | June 27, 1933 |
| 2,138,966 | Hafner | Dec. 6, 1938 |
| 2,237,193 | Mobsby | Apr. 1, 1941 |
| 2,334,085 | Graves | Nov. 9, 1943 |
| 2,392,873 | Zahl | Jan. 15, 1946 |

FOREIGN PATENTS

| | | |
|---|---|---|
| 384,325 | Great Britain | Dec. 5, 1932 |